(12) United States Patent
Schwartz et al.

(10) Patent No.: US 6,226,358 B1
(45) Date of Patent: *May 1, 2001

(54) VOICE-MAIL GREETING MESSAGE NOTIFICATION

(75) Inventors: Alan Ira Schwartz; Bette T. Schwartz, both of Bridgewater, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,499

(22) Filed: Sep. 30, 1997

(51) Int. Cl.$^7$ ..................................................... H04M 1/64
(52) U.S. Cl. .............................. 379/67.1; 379/76; 379/87; 379/88.12; 379/88.23; 379/88.18
(58) Field of Search ................................ 379/67.1, 88.01, 379/88.04, 88.18, 88.16, 88.22, 88.23, 88.25, 76, 84, 74, 68, 69, 70, 77, 87, 88.12

(56) References Cited

U.S. PATENT DOCUMENTS

| | | | |
|---|---|---|---|
| 4,747,126 | * | 5/1988 | Hood et al. ............................. 379/74 |
| 4,837,798 | * | 6/1989 | Cohen et al. ........................... 379/88 |
| 5,117,451 | * | 5/1992 | Ladd et al. ........................... 379/67.1 |
| 5,434,908 | * | 7/1995 | Klein .................................. 379/88.22 |
| 5,633,917 | * | 5/1997 | Rogers .................................. 379/74 |
| 5,768,347 | * | 6/1998 | Beyda ................................ 379/88.22 |
| 5,892,814 | * | 4/1999 | Brisebois et al. ................. 379/88.24 |
| 6,058,178 | * | 5/2000 | McKendry et al. ................. 379/212 |

* cited by examiner

*Primary Examiner*—Stella Woo
*Assistant Examiner*—Binh K. Tieu

(57) ABSTRACT

The invention provides a method and system for prompt recipient notification of the active greeting on a voice message system, with the notification provided on initial recipient access of the voice message system, typically at the same time as the recipient is informed of new voice messages. Notification of the active greeting on initial access provides the recipient the opportunity to modify an outdated greeting thereby providing more current information. The invention also provides a method and system for automatically restoring the primary greeting at a predetermined date without the necessity of the recipient accessing the voice message administration area on that predetermined date.

34 Claims, 3 Drawing Sheets

VOICE-MAIL GREETING MESSAGE NOTIFICATION

FIELD OF THE INVENTION

The present invention relates to the field of voice message systems and more specifically to the field of message systems with multiple greeting messages that are remotely accessible and selectable by the owner.

BACKGROUND OF THE INVENTION

Within the field of audio telecommunications, there has been a large growth of voice message systems that provide an opportunity for a caller to leave a voice message if the desired recipient, or user, is unavailable. These voice message systems may be either local, supporting a single telecommunication circuit, or they may be network based, supporting multiple telecommunication circuits. A telecommunication circuit includes telephone lines within the Public Switched Telephone Network (PSTN), in addition to other services (e.g. wireless). Typically, a user or recipient will establish a form of voice mail box, where messages are collected, stored, and maintained according to the recipient's instruction. According to the recipient's instructions, the voice message system will respond to a caller and provide them with various options. Prior to recording a caller's voice message in the voice mail box, the voice message system typically plays an outgoing announcement greeting.

Today's voice message systems typically provide recipients the ability to manage their announcement greetings for the purpose of providing a personalized outgoing greeting to incoming callers. Typically, the recorded greeting serves to provide the caller with notification of the recipient's status, i.e. "I am out of the office today and will return on Monday. Please leave your name and number." The voice message system often has the capability to store multiple outgoing greetings, though only one greeting may be active at a time. This active outgoing greeting is typically heard by the calling party, but not by the recipient, unless the recipient calls their own number directly, or checks the voice message administration area. As a result, the recipient has no reminder or notification of the currently active greeting. Specifically, when the recipient checks their voice mail box for stored messages, there is no indication as to which outgoing greeting is currently active. As a result, the recipient may inadvertently have an outdated greeting announcement.

None of the current voice mail systems provide an ability for the recipient to readily identify the active outgoing greeting. Specifically, none notify the recipient of the active greeting when they check or retrieve voice mail messages.

For many recipients, a primary greeting that is active for normal activity will be established, with secondary greetings recorded and active for unusual circumstances. These unusual circumstances might include planned travel or vacation. In some of these unusual circumstances, the length of time for the secondary greeting to be active is known in advance. At the end of the time, the primary greeting will be automatically restored. However, the current systems do not automatically restore the primary greeting. Rather, on the date that the greeting is to be changed, the recipient must manually enter the voice mail administration area and re-activate the primary greeting.

None of the existing systems automatically revert the outgoing greeting to the primary greeting at a predetermined date according to the recipient's instructions.

SUMMARY OF THE INVENTION

The present invention features a method and system for voice message recipients to differentiate between active outgoing greetings without the need to enter the message administration or maintenance mode. Specifically, the present invention notifies the recipient of the active outgoing greeting when they check or retrieve voice mail messages, with the additional ability to readily modify the greeting if desired.

The present invention also provides a method and system to have the outgoing greeting automatically revert to the primary greeting according to the recipient's instructions.

In one aspect, the invention provides notification of the active greeting on initial voice mail box access.

In another aspect, the invention provides notification of the active greeting through different audio tones to distinguish different greetings.

In yet another aspect, the invention provides notification of the active greeting through verbal announcement as to the currently active greeting.

In yet another aspect, the invention provides notification of the active greeting through visual indication as to the currently active greeting.

In yet another aspect, the invention provides interaction with the recipient through voice recognition.

In yet another aspect, the invention provides interaction with the recipient through keypad entry.

These and other advantages of the current invention will be apparent to those of ordinary skill in the art by reference to the following detailed description and the accompanying drawings.

DETAILED DESCRIPTION OF THE PREFERRED EMBODIMENT

Figure 1:
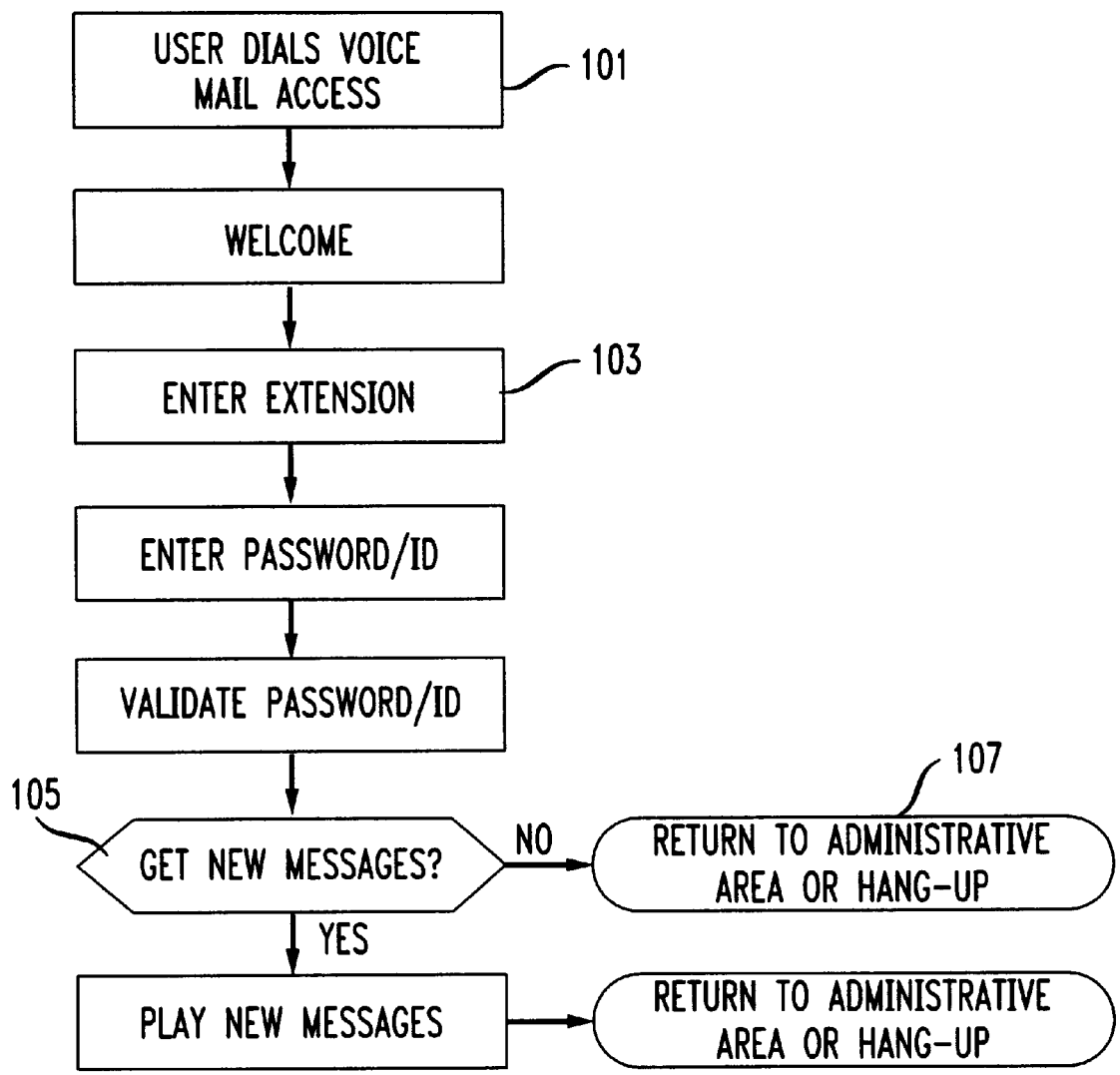
FIG. 1 shows the logic flow of a typical voice mail message system.

Referring now to the figures, where like numbers refer to like structure in the different figures, a typical voice message system is illustrated in FIG. 1. On initial access 101 of the system, the recipient enters their telephone extension 103 and is presented with an announcement as to new messages 105, or a number of options 107. Typically, the recipient will listen to new voice mail messages and perform associated mail maintenance (save message, delete message, forward message, etc.) and then hang-up or quit. It is only when the recipient specifically enters the outgoing voice mail message administration area 107 that they learn which outgoing greeting is currently active. It is also through this maintenance activity that the recipient has the option to change the active outgoing greeting. In the typical voice message system, the recipient navigates through the various alternative selections through keypad entries, or through voice recognition of the recipient's spoken selection.

Figure 2:
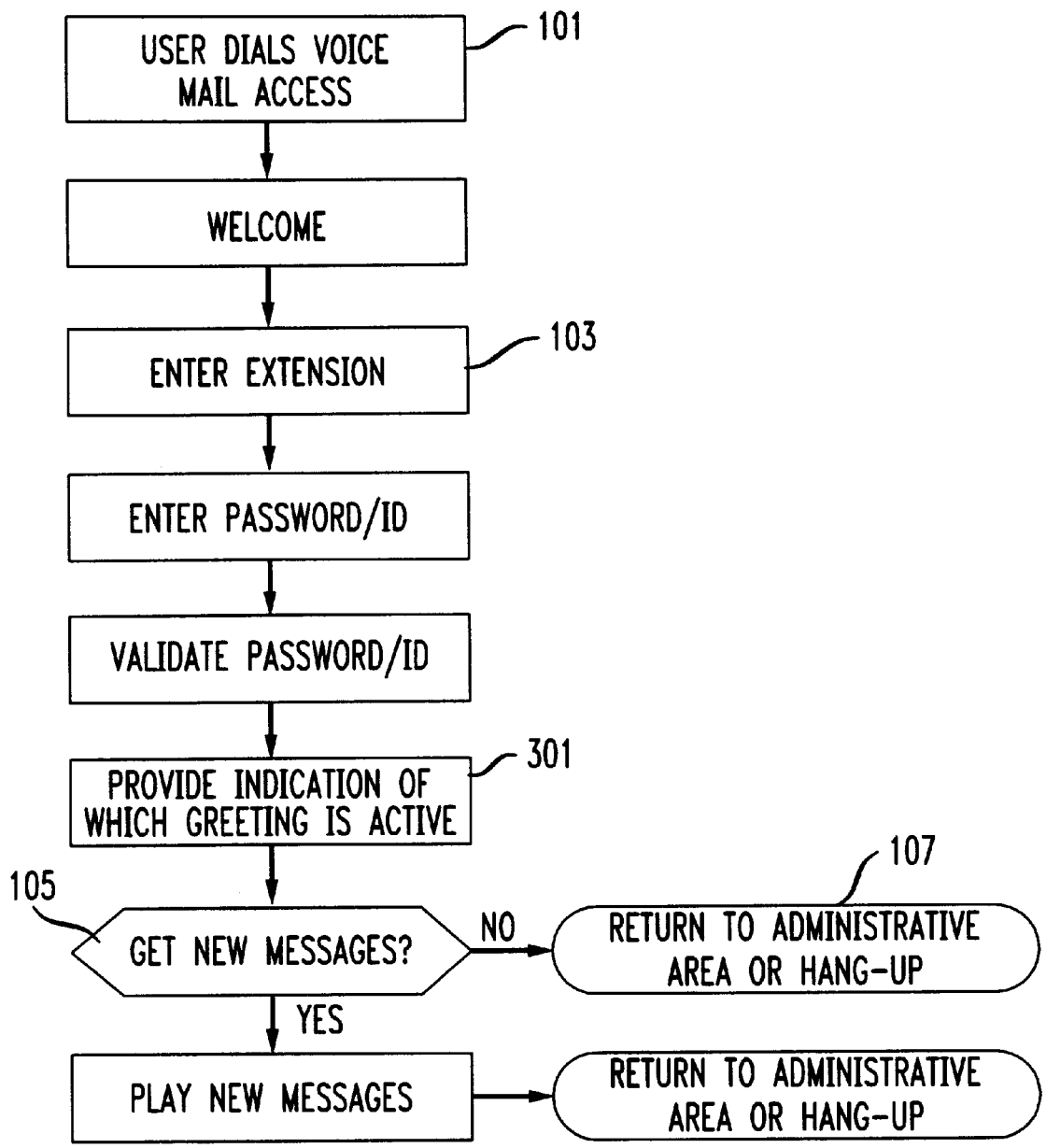
FIG. 2 shows the logic flow of an example of the present invention.

Referring now to FIG. 2, in the preferred embodiment, the invention provides an initial indication of which greeting is active 301 when the voice message system is initially accessed. This initial indication is provided after the user has accessed 101 the system and entered their extension 103, but before they are informed of new messages 105. This indication of the currently active outgoing greeting, which is provided before the indication of new mail, alerts the recipient, and if the greeting is no longer valid, allows them to promptly modify the outgoing greeting. In the preferred embodiment of the present invention, this modification of the outgoing greeting is accomplished through the existing mail administration area 107.

The form used to indicate the currently active outgoing greeting may be accomplished through a number of different methods. Examples include different audible tones, with one tone for the primary greeting and other tones for alternative greetings. Alternatively, the form of indication may be visual, using different types of light illumination on the access device. In another alternative, the form of indication might be through recorded or verbal notification where the recipient is told, for example, that their primary greeting has been disabled and that they have new voice messages.

In the present invention, the recipient's interaction with the voice message system may be through any of several techniques. This interaction includes a keypad entry in response to a menu selection. Alternatively, the interaction might be through voice recognition of the recipient's spoken selection, also in response to a menu selection. Other interaction methods are equally suitable, though not specifically listed.

Figure 3:
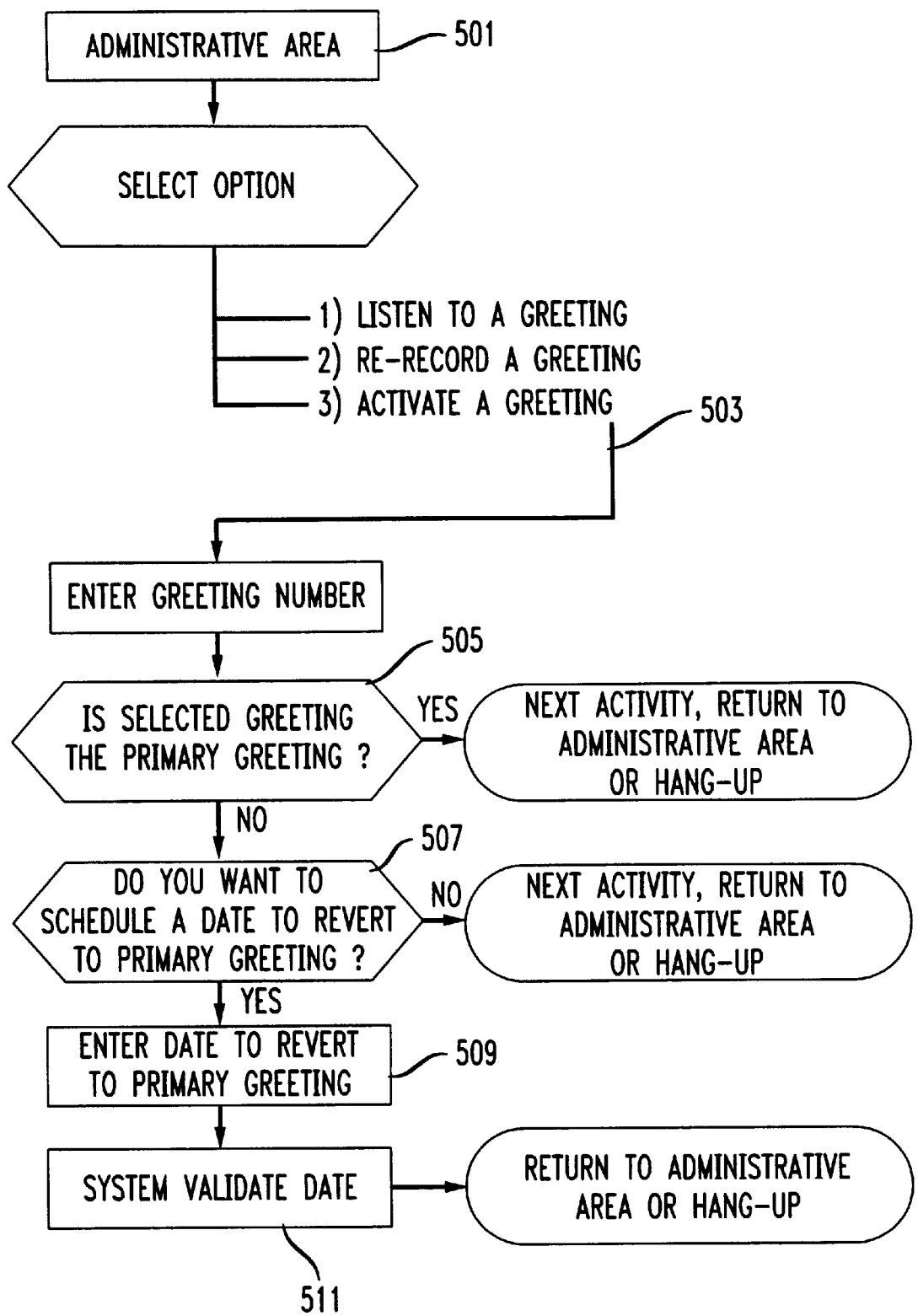
FIG. 3 shows the logic flow for automatic reversion to the primary greeting as another aspect of the present invention.

Referring to FIG. 3, a logic flow of the present invention, whereby the primary voice mail message is automatically activated at a pre-determined date is illustrated. As an example of this aspect of the present invention, the recipient may know in advance the date when the primary greeting should be re-activated. This might occur when, for example, the recipient is on travel or vacation and knows in advance the date of return. In this aspect, when the recipient enters the voice mail administrative area 501, and determines to activate a greeting 503, the invention will determine whether the greeting selected for activation is the primary greeting 505. If the greeting is not the primary greeting, the recipient is provided an opportunity to indicate they want the primary greeting to revert at a predetermined date 507. The invention then verifies that the date selected 509 is valid 511. In this manner, the present invention allows the recipient to program the voice mail system to automatically revert to the primary greeting at a pre-determined date, without the need to enter the voice mail administrative area, at the pre-determined date.

While the example has used the primary greeting as the greeting to be activated at a pre-determined date, the present invention could also automatically activate any other message at a pre-determined date and thereby avoid the necessity of entering the administrative area at the pre-determined date.

The method described above is readily implemented in most voice message systems. The system of the present invention has the ability to store and maintain at least two voice greetings and provides the recipient with the ability to select an active greeting from the stored greetings. The system of the present invention further has the ability to interact with the recipient through a number of different forms. For example, the system may use a keypad entry system, similar to that found on a typical touch-tone phone pad. The system may also interact through voice recognition techniques that are implemented in hardware or software, programmed to recognize phrases, sounds or words spoken by the recipient. The system may also interact with the recipient through lights that are present on the recipient's access device or phone set. As an example, the lights used for interaction may be the lights that indicate unheard messages are recorded. The lights could also be special purpose lights on the access device, with specific purpose being to inform the recipient of the active greeting.

In the system of the present invention, the instructions to implement the invention may be implemented through hardware, or software or a combination of both. The choice will likely depend on how the voice message system is implemented. Further, they may be stored in the local access device or phone set, or they may be stored in a central location or facility. Again, the choice will likely depend on how and where the different greetings are stored.

As can be readily seen, these techniques and others for informing recipients of their active greeting, or activating a greeting at a pre-determined date can be used in the present invention without deviating from the scope thereof as defined in the appended claims.

What is claimed is:

1. A method for providing notification to an assigned user of their active greeting in the assigned user's voice mail system comprising:

alerting the assigned user as to their active greeting upon the assigned user accessing the voice mail system in order to check for or retrieve received voice mail messages, and before entry of additional commands, whereby said user learns which greeting is active without having to listen to said greeting; and providing the assigned user an option to modify their active greeting.

2. A method according to claim 1, wherein alerting the assigned user further comprises:

alerting with audible tones, wherein different greetings are further represented by different tones.

3. A method according to claim 1, wherein alerting the assigned user further comprises:

alerting with a verbal announcement.

4. A method according to claim 1, wherein alerting the assigned user further comprises:

alerting with visible means, wherein different greetings are further represented by different visual representations.

5. A method according to claim 4, wherein the visual means further comprise flashing lights.

6. A method according to claim 5, wherein different greetings are represented by flashing lights of different duration.

7. A method according to claim 1, wherein providing the assigned user the option to modify further comprises:

detecting user selections through voice recognition means.

8. A method according to claim 1, wherein providing the assigned user the option to modify further comprises:

detecting user keypad entries.

9. A system for providing notification to an assigned user of their active greeting in the assigned user's voice mail system comprising:

means for alerting the assigned user as to their active greeting upon the assigned user accessing the voice mail system in order to check for or retrieve received voice mail messages, and before entry of additional commands, whereby said user learns which greeting is active without having to listen to said greeting; and means for providing the assigned user the option to modify their active greeting.

10. A system according to claim 9, wherein the means for alerting further comprises;

means for alerting with audible tones, with different greetings represented by different tones.

11. A system according to claim 9, wherein the means for alerting further comprises:
   means for alerting with verbal announcements.

12. A system according to claim 9, wherein the means for alerting further comprises:
   means for alerting with visual means, with different greetings represented by different visual representations.

13. A system according to claim 12, wherein the different visual representations are provided by flashing lights.

14. A system according to claim 13, wherein flashing lights of different duration represent different greetings.

15. A system according to claim 9, wherein the means for providing the assigned user the option to modify further comprises:
   means for voice recognition of user selections.

16. A system according to claim 9, wherein the means for providing the assigned user the option to modify further comprises:
   means for detecting user keypad entries.

17. Computer executable software code stored on a computer readable medium, the code for providing notification to an assigned user of their active greeting in the assigned user's voice mail system, the code comprising:
   code to alert the assigned user as to their active greeting upon the assigned user accessing the voice mail system in order to check for or retrieve received voice mail messages, and before entry of additional commands, whereby said user learns which greeting is active without having to listen to said greeting; and
   code to provide the assigned user an option to modify their active greeting.

18. Computer executable software code according to claim 17, wherein the code to alert the assigned user further comprises:
   code to alert with audible tones, wherein different greetings are further represented by different tones.

19. Computer executable software code according to claim 17, wherein the code to alert the assigned user further comprises:
   code to alert with a verbal announcement.

20. Computer executable software code according to claim 17, wherein the code to alert the assigned user further comprises:
   code to alert with visible means, wherein different greetings are further represented by different visual representations.

21. Computer executable software code according to claim 17, wherein the code to provide the assigned user an option further comprises:
   code to detect user selections through voice recognition means.

22. Computer executable software code according to claim 17, wherein the code to provide the assigned user an option further comprises:
   code to detect user keypad entries.

23. A computer-readable medium having computer executable software code stored thereon, the code for providing notification to an assigned user of their active greeting in the assigned user's voice mail system, the code comprising:
   code to alert the assigned user as to their active greeting upon the assigned user accessing the voice mail system in order to check for or retrieve received voice mail messages, and before entry of additional commands, whereby said user learns which greeting is active without having to listen to said greeting; and
   code to provide the assigned user an option to modify their active greeting.

24. A computer-readable medium according to claim 23, wherein the code to alert the assigned user further comprises:
   code to alert with audible tones, wherein different greetings are further represented by different tones.

25. A computer-readable medium according to claim 23, wherein the code to alert the assigned user further comprises:
   code to alert with a verbal announcement.

26. A computer-readable medium according to claim 23, wherein the code to alert the assigned user further comprises:
   code to alert with visible means, wherein different greetings are further represented by different visual representations.

27. A computer-readable medium according to claim 23, wherein the code to provide the assigned user an option further comprises:
   code to detect user selections through voice recognition means.

28. A computer-readable medium according to claim 23, wherein the code to provide the assigned user an option further comprises:
   code to detect user keypad entries.

29. A programmed computer for providing notification to an assigned user of their active greeting in the assigned user's voice mail system, comprising:
   a memory having at least one region for storing computer executable program code; and
   a processor for executing the program code stored in the memory; wherein the program code includes code to alert the assigned user as to their active greeting upon the assigned user accessing the voice mail system in order to check for or retrieve received voice mail messages, and before entry of additional commands, whereby said user learns which greeting is active without having to listen to said greeting;
   and code to provide the assigned user an option to modify their active greeting.

30. A programmed computer according to claim 29, wherein the code to alert the assigned user further comprises:
   code to alert with audible tones, wherein different greetings are further represented by different tones.

31. A programmed computer according to claim 29, wherein the code to alert the assigned user further comprises:
   code to alert with a verbal announcement.

32. A programmed computer according to claim 29, wherein the code to alert the assigned user further comprises:
   code to alert with visible means, wherein different greetings are further represented by different visual representations.

33. A programmed computer according to claim 29, wherein the code to provide the assigned user an option further comprises:
   code to detect user selections through voice recognition means.

34. A programmed computer according to claim 29, wherein the code to provide the assigned user an option further comprises:
   code to detect user keypad entries.

* * * * *